United States Patent
Katano

(10) Patent No.: US 8,941,866 B2
(45) Date of Patent: Jan. 27, 2015

(54) PRINT CONTROL APPARATUS, PRINT CONTROL METHOD, AND STORAGE MEDIUM STORING PROGRAM

(75) Inventor: Kiyoshi Katano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 13/560,525

(22) Filed: Jul. 27, 2012

(65) Prior Publication Data

US 2013/0044353 A1 Feb. 21, 2013

(30) Foreign Application Priority Data

Aug. 19, 2011 (JP) .................... 2011-179913

(51) Int. Cl.
*G06F 3/12* (2006.01)
(52) U.S. Cl.
CPC .............. *G06F 3/122* (2013.01); *G06F 3/1229* (2013.01); *G06F 3/1247* (2013.01); *G06F 3/1267* (2013.01); *G06F 3/1288* (2013.01)
USPC .......................... 358/1.15; 358/1.13; 358/1.14
(58) Field of Classification Search
CPC .............................. G06F 3/1292; G06F 3/1285
USPC ........................ 358/1.14, 1.15, 1.13; 713/193
See application file for complete search history.

(56) References Cited

U.S. PATENT DOCUMENTS

| | | | | |
|---|---|---|---|---|
| 6,711,677 | B1* | 3/2004 | Wiegley | 713/151 |
| 6,952,780 | B2* | 10/2005 | Olsen et al. | 726/26 |
| 7,084,997 | B2* | 8/2006 | Clough | 358/1.15 |
| 7,213,138 | B2 | 5/2007 | Fukunaga et al. | |
| 7,460,265 | B2 | 12/2008 | Keeney et al. | |
| 8,355,151 | B2* | 1/2013 | Tsutsumi | 358/1.15 |
| 8,402,277 | B2* | 3/2013 | Wang et al. | 713/178 |
| 2002/0105666 | A1* | 8/2002 | Sesek | 358/1.14 |
| 2002/0171859 | A1* | 11/2002 | Chen et al. | 358/1.14 |
| 2005/0128508 | A1* | 6/2005 | Greeff et al. | 358/1.15 |

* cited by examiner

*Primary Examiner* — Dennis Dicker

(74) *Attorney, Agent, or Firm* — Fitzpatrick, Cella, Harper & Scinto

(57) ABSTRACT

It is determined to cause the printing apparatus to print when the printing apparatus receives a first print job which is issued and does not cause the printing apparatus to print. When it is determined to cause the printing apparatus to print, the print control apparatus controls the printing apparatus to print an image corresponding to a second print job for causing the printing apparatus to print based on the second print job.

17 Claims, 5 Drawing Sheets

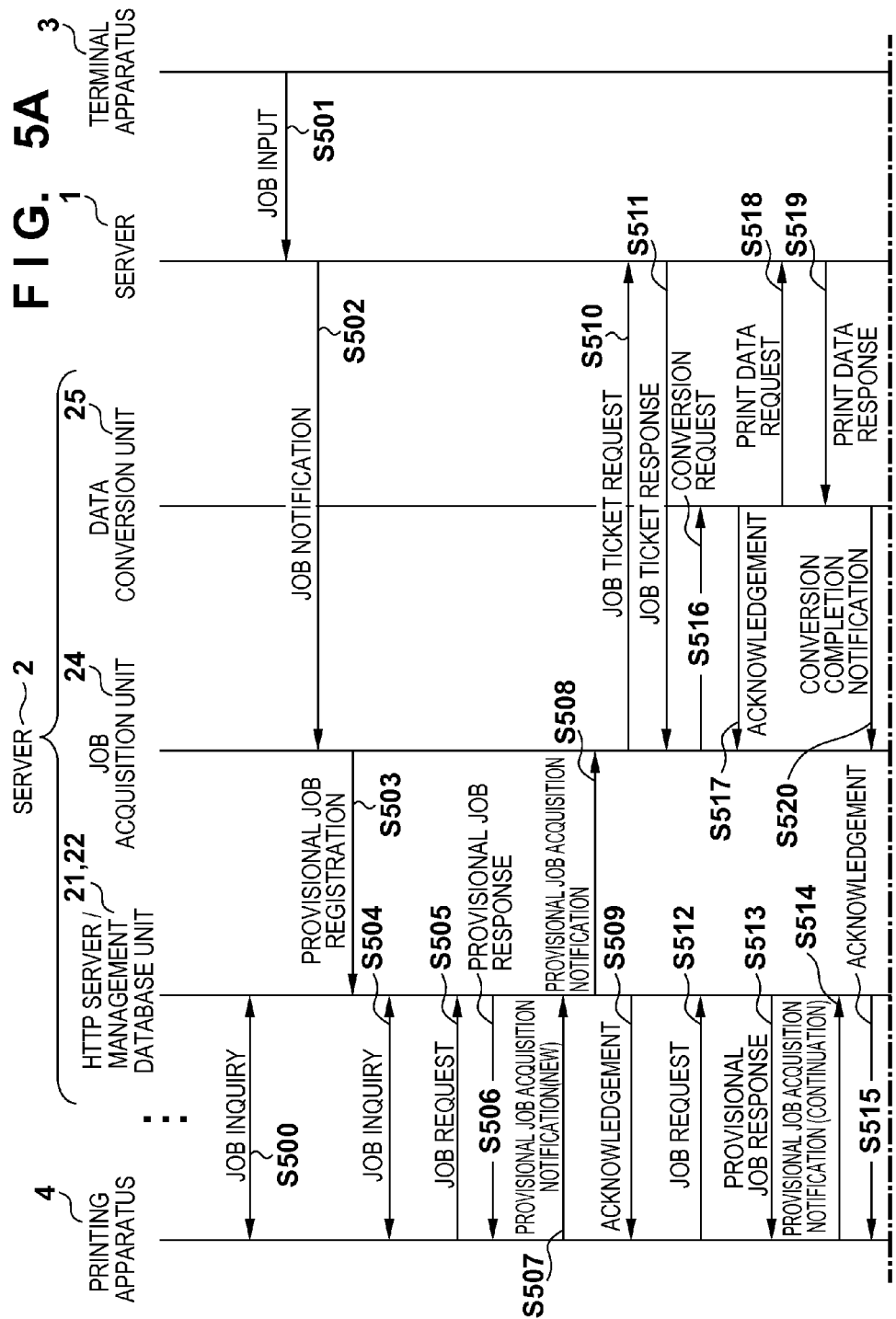

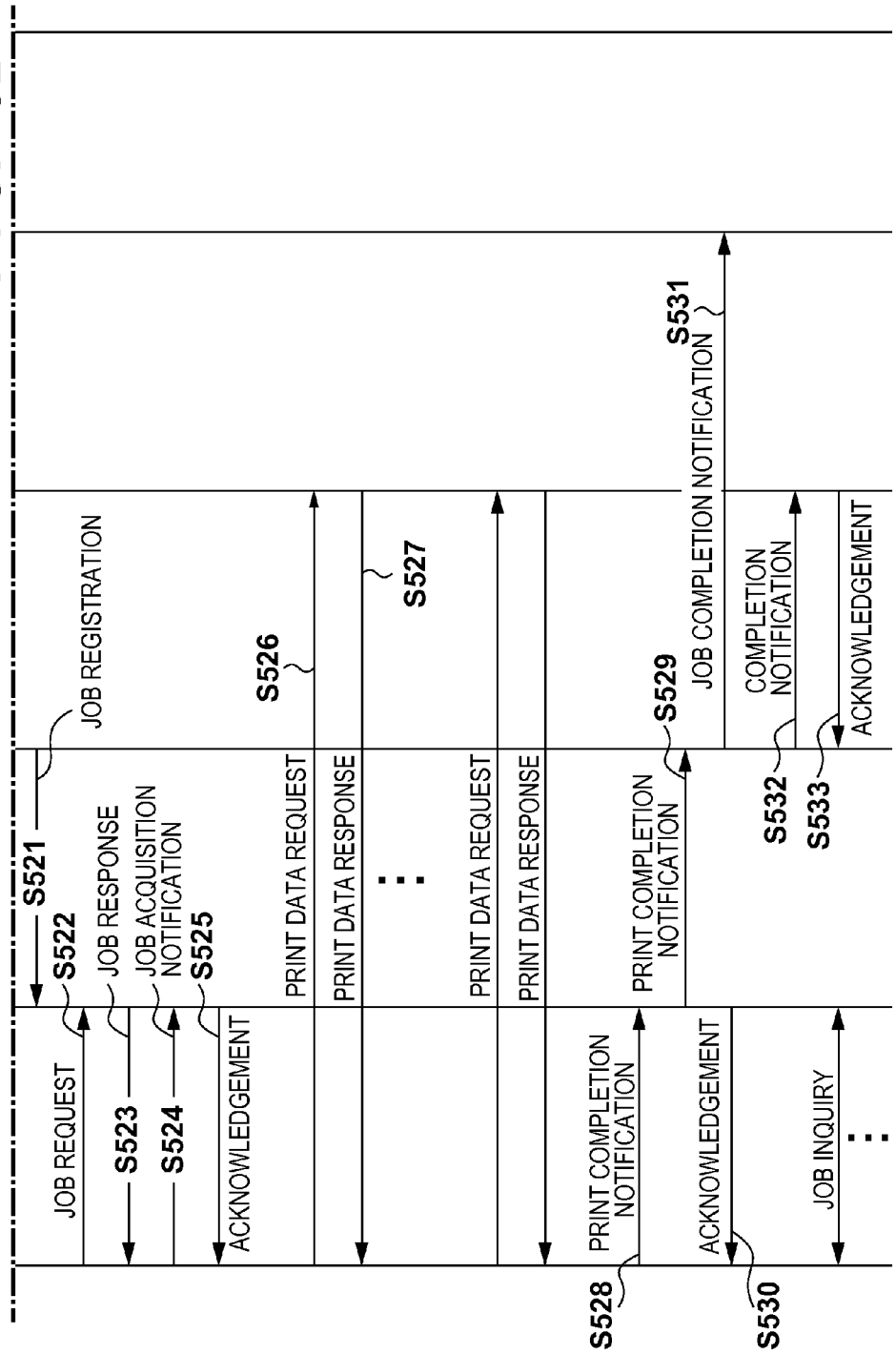

PRINT CONTROL APPARATUS, PRINT CONTROL METHOD, AND STORAGE MEDIUM STORING PROGRAM

BACKGROUND OF THE INVENTION

1. Field of the Invention

The present invention relates to a print control apparatus and print control method for controlling a printing apparatus to print an image, and a storage medium storing a program.

2. Description of the Related Art

A printing system is known in which the user designates printing of image data in a server via a terminal apparatus. In the printing system, a print job is input to a printing apparatus from the server which stores image data to be printed.

U.S. Pat. No. 7,460,265 discloses a method of converting, into a format capable of print processing by a printing apparatus, a print content submitted from a print job source into a spool server. The printing apparatus acquires format-converted data from the spool server by polling, and prints it. The spool server holds format-converted data regardless of acquisition of a print job by the printing apparatus.

As disclosed in U.S. Pat. No. 7,460,265, when a print job is issued to the printing apparatus after data format conversion by the server, the server needs to hold the converted data until the printing apparatus executes the print job.

For example, when the server converts the data format and the printing apparatus is in the unprintable state, the server needs to hold the data until the printing apparatus recovers to the printable state. In some cases, format-converted data are accumulated in the server, wasting the memory capacity of the server.

SUMMARY OF THE INVENTION

An aspect of the present invention is to eliminate the above-mentioned problems with the conventional technology. The present invention provides a print control apparatus and print control method capable of appropriately acquiring data to be printed, and a storage medium storing a program.

The present invention in its first aspect provides a print control apparatus comprising: an issuing unit configured to issue a print job to a printing apparatus; a determination unit configured to determine to cause the printing apparatus to print in a case where the printing apparatus receives a first print job which is issued by the issuing unit and does not cause the printing apparatus to print; and a print control unit configured to, in a case where the determination unit determines to cause the printing apparatus to print, control the printing apparatus to print an image corresponding to a second print job for causing the printing apparatus to print based on the second print job that is issued by the issuing unit.

The present invention in its second aspect provides a print control method comprising: issuing a print job to a printing apparatus; determining to cause the printing apparatus to print in a case where the printing apparatus receives a first print job which is issued in the issuing step and does not cause the printing apparatus to print; and in a case where the printing apparatus is determined in the determination step to be caused to print, controlling the printing apparatus to print an image corresponding to a second print job for causing the printing apparatus to print based on the second print job that is issued in the issuing step.

The present invention in its third aspect provides a computer-readable storage medium storing a program for causing a printing apparatus to print an image, the program causing a computer to: issue a print job to the printing apparatus, determine to cause the printing apparatus to print in a case where the printing apparatus receives a first print job which is issued and does not cause the printing apparatus to print, and in a case where the printing apparatus is determined in the determination step to be caused to print, controlling the printing apparatus to print an image corresponding to a second print job for causing the printing apparatus to print based on the second print job that is issued.

According to the present invention, a printing apparatus can appropriately acquire data to be printed.

Further features of the present invention will become apparent from the following description of exemplary embodiments with reference to the attached drawings.

BRIEF DESCRIPTION OF THE DRAWINGS

FIGS. 5A and 5B are flowcharts showing a print job control processing sequence.

DESCRIPTION OF THE EMBODIMENTS

Figure 1:
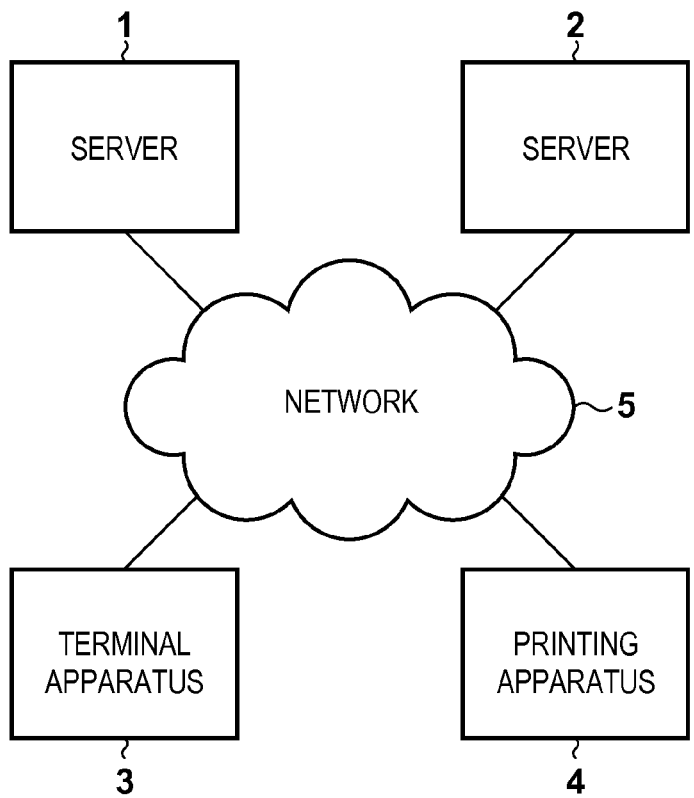
FIG. 1 is a view showing the configuration of a printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

FIG. 1 is a view showing the configuration of a printing system in an embodiment according to the present invention. As shown in FIG. 1, the printing system includes a server 1, server 2, terminal apparatus 3, and printing apparatus 4, which can communicate with each other via a network 5 such as the Internet. In the embodiment, the terminal apparatus 3 and printing apparatus 4 may be connected to the network 5 via a router or gateway (not shown).

In the system shown in FIG. 1, the user selects data to be printed via the operation unit of the terminal apparatus 3 from images stored in the server 1, and instructs the terminal apparatus 3 to print. In accordance with the instruction from the user, the terminal apparatus 3 instructs the server 1 via the network 5 to print. This instruction includes information for specifying data to be printed that has been selected by the user. When the terminal apparatus 3 instructs the server 1 to print, the server 1 specifies data to be printed, and transmits the data to the server 2 via the network 5.

The server 2 converts the data to be printed that has been transmitted from the server 1, into data printable by the printing apparatus 4. The server 2 transmits the converted data as a print job to the printing apparatus 4, and causes the printing apparatus 4 to print an image.

Figure 2:
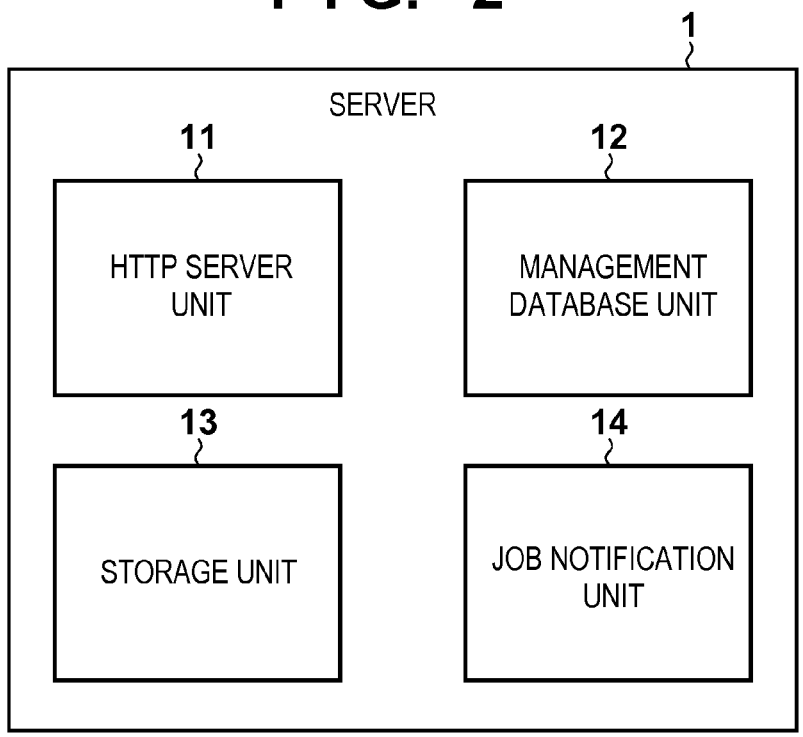
FIG. 2 is a block diagram showing the arrangement of a server 1.

FIG. 2 is a block diagram showing the arrangement of the server 1. As shown in FIG. 2, the server 1 includes an HTTP server unit 11, management database unit 12, storage unit 13, and job notification unit 14. The HTTP server unit 11 receives an HTTP request from the outside, and transmits an HTTP response to the outside. The server 1 receives a print instruction from the user as a print job via the HTTP server unit 11. The print job designates image data to be printed, and a printing apparatus which is to print the image data. The management database unit 12 manages information about a user who accesses the server 1, and a print job designated by the user.

The storage unit 13 stores image data (to be referred to as print data hereinafter) printing of which can be designated from the user. The job notification unit 14 notifies, of a print job corresponding to a print instruction from the user, a printing apparatus designated by the print job or a server associated with the printing apparatus. In the embodiment, the job notification unit 14 transmits a print job corresponding to a print instruction from the user to the server 2 associated with the printing apparatus 4 designated by the print job, and notifies the print job.

Figure 3:
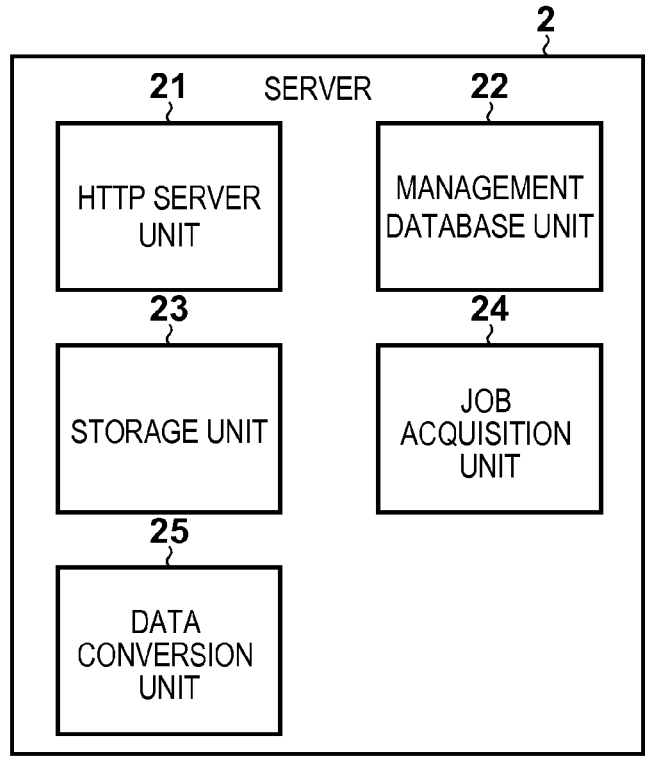
FIG. 3 is a block diagram showing the arrangement of a server 2.

FIG. 3 is a block diagram showing the arrangement of the server 2. As shown in FIG. 3, the server 2 includes an HTTP server unit 21, management database unit 22, storage unit 23, job acquisition unit 24, and data conversion unit 25. The HTTP server unit 21 receives an HTTP request from the outside, and transmits an HTTP response to the outside. The server 2 receives a print job from the server 1 via the HTTP server unit 21. The management database unit 22 manages information about the printing apparatus 4 which accesses the server 2, and a print job to be transmitted to the printing apparatus 4. When a print job is registered in the management database unit 22, the registered print job is transmitted to the printing apparatus 4 by polling executed by the printing apparatus 4.

The storage unit 23 is a storage unit which stores print data whose format has been converted for transmission to the printing apparatus 4. When a print job is notified from the outside (server 1), the job acquisition unit 24 registers, in the management database unit 22, a provisional print job, or a print job which designates print data to be printed.

The provisional print job is a print job which suspends designation of print data to be printed. In the embodiment, when the provisional print job is registered in the management database unit 22, it is transmitted to the printing apparatus 4 by polling executed by the printing apparatus 4. Whether the printing apparatus 4 is in the image printable state is confirmed based on whether the provisional print job has been transmitted to the printing apparatus 4.

Particularly in the embodiment, before data to be printed is received from the server 1 via the HTTP server unit 21, a provisional print job is registered in the management database unit 22 and it is confirmed whether the printing apparatus 4 is in the image printable state. After confirming that the printing apparatus 4 is in the image printable state, data to be printed is received from the server 1, and the data format is converted. In other words, print data reception and format conversion processing wait until it is confirmed that the printing apparatus 4 is in the printable state after transmitting a provisional print job to the printing apparatus 4. For example, when the printing apparatus 4 is OFF and does not print an image, it can be prevented to receive print data by the server 2 and accumulate unprinted data in the server 2.

Note that the provisional print job has the same data format as that of a print job for executing printing, but does not designate data to be printed. Even if the printing apparatus 4 receives the provisional print job, it does not print. The printing apparatus receives the provisional print job by polling executed by the printing apparatus, similar to a print job (actual print job) which designates data to be printed.

Similar to an actual print job that causes the printing apparatus to print an image, the server 2 can register a provisional print job in the management database unit 22, and cause the printing apparatus 4 to receive the provisional print job. The printing apparatus 4 can receive the provisional print job by polling processing, similar to an actual print job.

Hence, even if a special command to confirm the status of the printing apparatus is not transmitted to the printing apparatus, the status (for example, power ON or online) of the printing apparatus can be confirmed.

Transmission of a provisional print job, transmission of data to be printed, and conversion processing will be described in detail later.

When print data acquired from the outside (server 1) has a format incapable of print processing by the printing apparatus 4, the data conversion unit 25 converts the format into a format capable of print processing by the printing apparatus 4. For example, assume that print data designated by a print job notified from the server 1 has a PDF format, and a format capable of print processing by the printing apparatus 4 is a raster image format. In this case, the data conversion unit 25 converts print data from the PDF format into the raster image format. The format-converted print data is stored in the storage unit 23.

The terminal apparatus 3 includes a Web browser for implementing an HTTP client function. The terminal apparatus 3 accesses the HTTP server unit 11 of the server 1 using the HTTP protocol, allowing the user to use the Web service of the server 1. More specifically, the user can designate the printing apparatus 4 and designate print processing via the terminal apparatus 3 using the Web service of the server 1. The printing apparatus 4 is registered in the management database unit 22 of the server 2. The print instruction from the user to the server 1 is transmitted to the printing apparatus 4 via the server 2, and the printing apparatus 4 prints in accordance with the print instruction. Note that the server 1, server 2, and terminal apparatus 3 shown in FIG. 1 use general-purpose information processing apparatuses such as a PC.

The information processing apparatus includes a CPU for controlling the overall information processing apparatus. The CPU expands, in a RAM, a program for implementing an operation in the embodiment that has been loaded from a hard disk, ROM, or the like, and executes the program. The information processing apparatus includes a display, and displays a user interface on the display. The information processing apparatus includes a display driver for controlling the display. The user can designate printing of print data he wants, on the user interface displayed on the display using a pointing device and keyboard.

Figure 4:
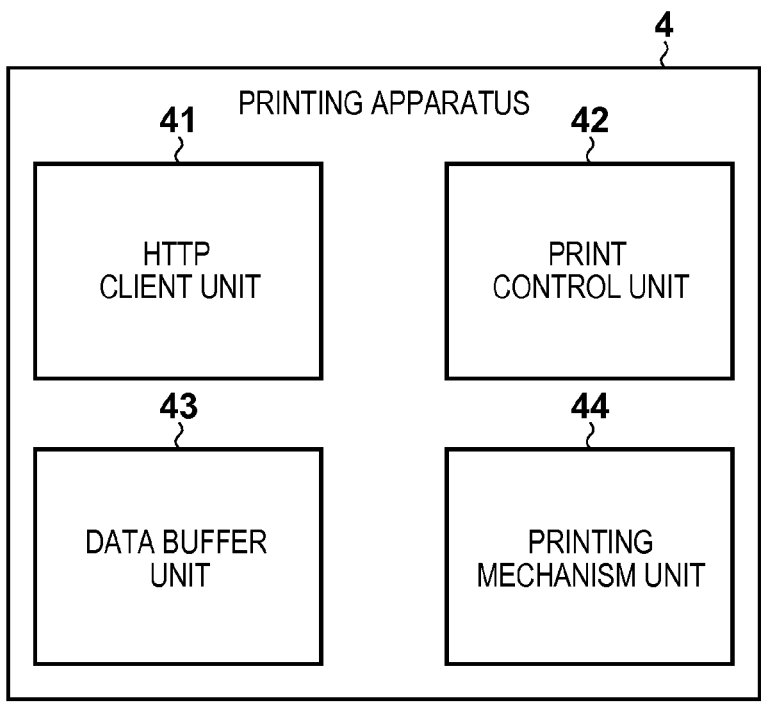
FIG. 4 is a block diagram showing the arrangement of a printing apparatus 4.

FIG. 4 is a block diagram showing the arrangement of the printing apparatus 4. The printing apparatus 4 includes an HTTP client unit 41, print control unit 42, data buffer unit 43, and printing mechanism unit 44. The HTTP client unit 41 accesses the HTTP server unit 21 of the server 2 to inquire the presence/absence of a print job to be printed in the printing apparatus 4, and request the print job. The printing apparatus 4 uses the HTTP protocol in communication with the server 2. The print control unit 42 performs conveyance control and scanning control for a printing medium and printhead in the printing mechanism unit 44. The data buffer unit 43 stores print data transmitted to the printing apparatus 4 till print processing.

Figure 6:
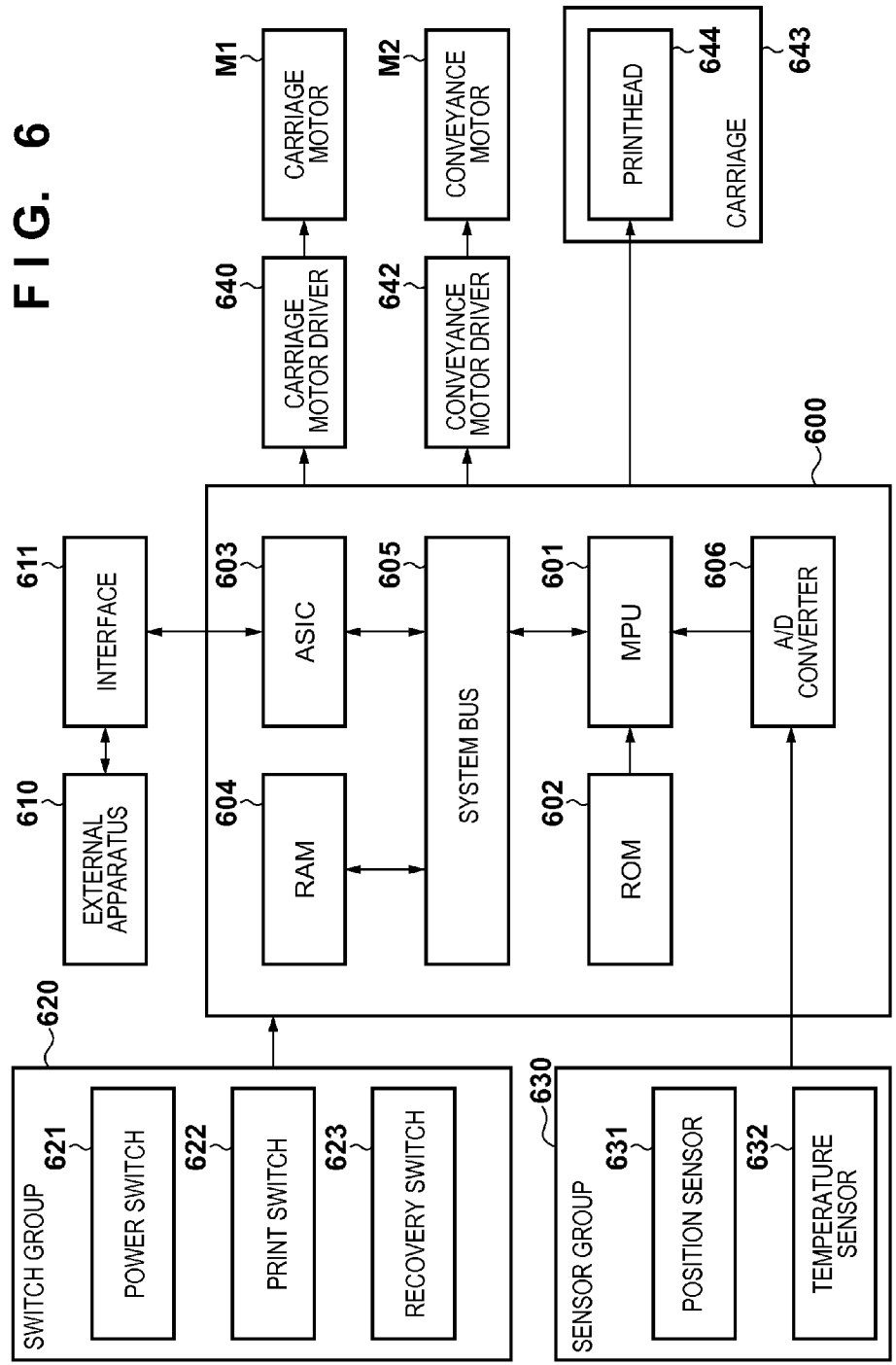
FIG. 6 is a block diagram exemplifying the detailed arrangement of the printing apparatus 4.

FIG. 6 is a block diagram exemplifying the detailed arrangement of the printing apparatus 4. An arrangement when an inkjet printing apparatus is adopted as the printing apparatus 4 will be exemplified. As shown in FIG. 6, a control unit 600 includes an MPU 601, ROM 602, application specific integrated circuit (ASIC) 603, RAM 604, system bus 605, and A/D converter 606. The ROM 602 stores programs corresponding to control sequences (to be described later), necessary tables, and other permanent data. The ASIC 603 generates control signals to control a carriage motor M1, conveyance motor M2, and printhead 644. The RAM 604 provides an image data rasterization area, a work area for executing a program, and the like. The system bus 605 connects the respective blocks to each other to exchange data. The A/D converter 606 receives an analog signal from a sensor group (to be described later), A/D-converts it, and supplies the digital signal to the MPU 601.

Referring to FIG. 6, an external apparatus 610 is an apparatus serving as a print data supply source, and corresponds to the server 2 in the embodiment. The external apparatus 610 and printing apparatus 4 transmit/receive print data, commands, status signals, and the like to/from each other via an interface (I/F) 611. A switch group 620 includes switches for accepting instructions input by the operator, such as a power switch 621, a print switch 622 for instructing the start of printing, and a recovery switch 623 for designating activation of processing (recovery processing) for maintaining good ink discharge performance of the printhead 644. A sensor group 630 includes sensors for detecting the state of the printing apparatus 4, such as a position sensor 631 (for example, photocoupler) for detecting the home position, and a temperature sensor 632 arranged at an appropriate portion in the printing apparatus 4 to detect the ambient temperature.

A carriage motor driver 640 drives the carriage motor M1 to reciprocally scan a carriage 643 in directions that are perpendicular to the printing medium conveyance direction. A conveyance motor driver 642 drives the conveyance motor M2 to convey a printing medium. At the time of print scanning by the printhead 644, the ASIC 603 transfers printing element (discharge heater) driving data to the printhead 644 while directly accessing the storage area of the ROM 602. The print control unit 42 shown in FIG. 4 corresponds to, for example, the control unit 600 shown in FIG. 6. The printing mechanism unit 44 shown in FIG. 4 corresponds to, for example, the carriage motor M1, conveyance motor M2, printhead 644, and carriage 643 shown in FIG. 6.

An operation according to the data control method in the embodiment will be explained with reference to FIGS. 5A and 5B. FIGS. 5A and 5B are flowcharts showing a data control processing sequence in the embodiment. The printing apparatus 4 periodically inquires, of the server 2, the presence/absence of a print job to be processed in the printing apparatus 4 (step S500). The printing apparatus 4 makes the inquiry by transmitting an HTTP request from the HTTP client unit 41 to the HTTP server unit 21 of the server 2. The printing apparatus 4 receives a print job presence/absence result from the server 2 as a response to the HTTP request. Upon receiving the HTTP request from the printing apparatus 4, the server 2 searches the management database unit 22 to confirm the presence/absence of a print job to be processed in the printing apparatus 4, and transmits the confirmation result as an HTTP response to the printing apparatus 4. In the embodiment, the printing apparatus 4 periodically inquires, of the server 2, the presence/absence of a print job in this way.

When the user designates printing of print data he wants in the terminal apparatus 3, the terminal apparatus 3 transmits a print job to the server 1 (step S501). The user designates printing of print data such as photo data stored in the storage unit 13 of the server 1. The server 1 transmits the print job to the server 2, notifying the server 2 of the print job (step S502).

The job notification unit 14 of the server 1 notifies the job acquisition unit 24 of the server 2 of the print job.

Upon notifying the print job, the job acquisition unit 24 determines whether print data designated by the print job has a format capable of print processing by the printing apparatus 4. In this determination, for example, format information capable of print processing by the printing apparatus 4 that is managed in the management database unit 22 is compared with format information of print data designated by the print job. If the job acquisition unit 24 determines that the print data to be printed does not have a format capable of print processing by the printing apparatus 4, the job acquisition unit 24 of the server 2 registers, in the management database unit 22, a provisional print job which does not designate print data (step S503).

In the embodiment, when the printing apparatus 4 does not acquire the provisional print job registered in step S503, the process does not advance to step S504 and subsequent steps. For example, when the printing apparatus 4 is OFF and can neither perform polling nor job inquiry in step S500, a print data request to the server 1, which will be described in step S518, is not executed. It can therefore be prevented to receive print data by the server 2 though the printing apparatus 4 is in the unprintable state, accumulate the print data in the server 2, and waste the storage of the server 2.

The provisional print job may be registered by, for example, changing designation of print data to "suspend" in the description of the print job of which the job acquisition unit 24 has been notified, and registering the description-changed print job in the management database unit 22.

From this, upon receiving a provisional print job, the printing apparatus 4 can recognize that "the format of print data designated by a print job will be converted." From the provisional print job, the printing apparatus 4 can recognize that "print processing based on the print job suspends until format-converted print data is received." The printing apparatus 4 excludes another print processing until print data is received after receiving the provisional print job. Immediately when the printing apparatus 4 receives print data capable of print processing, it can start print processing. This can prevent a situation in which when the printing apparatus 4 receives print data corresponding to a provisional print job, it needs to wait for the completion of another print processing and the server 2 needs to hold the print data during the wait.

Especially when print data requires format conversion processing, another print processing may start while the server 2 performs conversion processing, and the converted data may not be printed quickly. In the embodiment, however, the printing apparatus 4 executes exclusion processing until print data is received after receiving a provisional print job, as described above. The printing apparatus 4 can quickly print data whose format has been converted by the server.

As will be described later, when the printing apparatus 4 notifies the server 2 of the completion of printing, the server 2 deletes format-converted print data stored in the storage unit 23. This can prevent accumulation of printed print data in the server 2.

A case in which the job acquisition unit 24 determines that print data has a format capable of print processing by the printing apparatus 4 will be described later. When the server 2 receives a print job presence/absence inquiry from the printing apparatus 4 while it has registered a provisional print job, the server 2 sends back a print job presence response to the printing apparatus 4 in step S506 (to be described later).

A case in which the printing apparatus 4 inquires the presence/absence of a print job of the server 2 (step S504), and receives a print job presence response from the server 2 will be explained. The printing apparatus 4 requests a print job of the server (step S505). Upon receiving the print job request, the server 2 has registered a provisional print job in the management database unit 22, and transmits the provisional print job as a response to the printing apparatus 4 (step S506). Upon receiving the provisional print job from the server 2, the printing apparatus 4 notifies the server 2 that the provisional print job has newly been acquired (step S507). Subsequent communication between the printing apparatus 4 and the server 2 is performed by HTTP communication between the HTTP client unit 41 and the HTTP server unit 21.

When the printing apparatus 4 receives the provisional print job in step S506, the designation of data to be printed in the print job is "suspend", and the printing apparatus 4 can recognize that the print job is a provisional print job. Thus, even if the printing apparatus 4 receives the print job in step S506, it does not perform print processing and suspends it until it receives an actual print job for printing. During the suspension, the printing apparatus 4 executes processing of excluding print processing other than one for an actual print job.

Upon receiving, from the printing apparatus 4, a notification that it has newly acquired the provisional print job, the server 2 transmits the notification to the job acquisition unit 24 (step S508). At this time, the server 2 transmits an acknowledgement to the printing apparatus 4 (step S509).

Upon receiving the notification that the printing apparatus 4 has acquired the provisional print job, the job acquisition unit 24 of the server 2 requests a job ticket of the server 1 (step S510), and acquires the job ticket from the server 1 (step S511). In step S518 (to be described later), the job acquisition unit 24 requests print data of the server 1. That is, after confirming that the printing apparatus 4 can acquire a provisional print job, the server 2 requests print data of the server 1.

After receiving the response in step S509, the printing apparatus 4 requests again a print job of the server 2 (step S512). The requested print job is a print job which designates print data to be printed. If the server 2 has not prepared print data converted into a format capable of print processing by the printing apparatus 4, the server 2 transmits again a provisional print job as a response (step S513). Upon receiving the provisional print job again, the printing apparatus 4 notifies the server 2 that it has acquired the provisional print job subsequently to the previous step (step S506) (step S514). The server 2 transmits an acknowledgement to the printing apparatus 4 (step S515). In the embodiment, the printing apparatus 4 repeats the processes in steps S512 to S515 for a predetermined period or by a predetermined number of times. If the printing apparatus 4 cannot acquire a print job which designates print data even after repeating these processes for a predetermined period or by a predetermined number of times, it stops a series of print job requests, and notifies the server 2 of the stop. In this case, the print processing is handled as a failure. If the server 2 is notified of the print processing failure, it may stop processing regarding print data, including format conversion processing.

In the embodiment, the printing apparatus 4 processes a series of print job requests while excluding another processing in the printing apparatus 4. For example, in FIGS. 5A and 5B, the printing apparatus 4 does not accept another processing request after the print job request in step S505 until the current print processing is completed or fails. For example, when the printing apparatus 4 includes a local interface (UI: not shown), another processing is another print request input via the interface. When the printing apparatus 4 is a multi-function peripheral configured by integrating a plurality of functions and has a copy function and the like, another processing is, for example, copy processing. In the embodiment, the printing apparatus 4 is controlled so that it does not accept a request of another processing other than printing based on a print job to be acquired from the server 2. Immediately when the printing apparatus 4 acquires a target print job, it can start print processing.

If the job acquisition unit 24 of the server 2 acquires the job ticket from the server 1 in step S511, it requests format conversion of the data conversion unit 25 (step S516). The data conversion unit 25 transmits an acknowledgement to the job acquisition unit 24 (step S517). In step S516, the job acquisition unit 24 transmits, to the data conversion unit 25, a print data request destination obtained from the job ticket. The data conversion unit 25 requests print data of the server 1 (step S518), and acquires it from the server 1 (step S519).

The data conversion unit 25 converts the acquired print data into a format capable of print processing by the printing apparatus 4, and upon completion of the conversion processing, notifies the job acquisition unit 24 of the completion (step S520). The data conversion unit 25 stores the format-converted print data in the storage unit 23. Upon receiving the completion notification, the job acquisition unit 24 changes the provisional print job so that the provisional print job registered in the management database unit 22 in step S503 designates the print data stored in the storage unit 23. That is, a print job which designates print data capable of print processing by the printing apparatus 4 is registered in the management database unit 22 instead of the previously registered provisional print job (step S521). In the embodiment, if format conversion is highly likely to be complete within a short time, the process may directly shift to the processing in step S521 after the processing in step S517.

The job acquisition unit 24 sets, in a print job to be registered in the management database unit 22 in step S521, information for acquiring, by the printing apparatus 4, data to be printed that is stored in the storage unit 23 after format conversion by the data conversion unit 25. The information includes, for example, a storage location where the data to be printed is stored in the storage unit 23, and a URL for specifying the data to be printed. In step S526 (to be described later), the printing apparatus 4 can acquire target data to be printed by accessing the server 2 in accordance with the URL and specifying the data to be printed.

If the printing apparatus 4 requests a print job of the server 2 while the print job which designates print data capable of print processing by the printing apparatus 4 is registered (step S522), the server 2 transmits, to the printing apparatus 4, the print job which designates print data capable of print processing by the printing apparatus 4 (step S523). The printing apparatus 4 notifies the server 2 that the printing apparatus 4 has acquired the print job which designates print data capable of print processing (step S524). Upon receiving the notification, the server 2 transmits an acknowledgement to the printing apparatus (step S525). After that, the printing apparatus 4 starts the following print processing.

The printing apparatus 4 requests, of the data conversion unit 25 of the server 2 in accordance with the print job received in step S523, format-converted print data designated by the print job (step S526). The data conversion unit 25 of the server 2 transmits the print data stored in the storage unit 23 to the printing apparatus 4 as a response to the request (step S527). The printing apparatus 4 executes a series of print data acquisition processes in steps S526 and S527 by a plurality of times for, for example, each predetermined size. The printing apparatus 4 stores the acquired print data in the data buffer unit 43. The print control unit 42 of the printing apparatus 4 controls the printing mechanism unit 44 to print on a printing medium based on the print data stored in the data buffer unit 43. Upon completion of printing, the printing apparatus 4 notifies the HTTP server unit 21 of the server 2 of the completion of printing (step S528).

Upon receiving the printing completion notification from the printing apparatus 4, the HTTP server unit 21 of the server 2 transmits the printing completion notification to the job acquisition unit 24 (step S529). At this time, the HTTP server unit 21 transmits an acknowledgement to the printing apparatus (S530). The job acquisition unit 24 notifies the server 1 of the completion of printing based on the print job (step S531). In addition, the job acquisition unit 24 of the server 2 notifies the data conversion unit 25 of the completion of printing (step S532). The data conversion unit 25 transmits an acknowledgement to the job acquisition unit 24 (step S533).

In step S533, upon receiving the printing completion notification from the job acquisition unit 24, the data conversion unit 25 deletes the format-converted print data stored in the storage unit 23. This can prevent accumulation of printed print data in the storage unit 23 of the server 2.

After step S530, the printing apparatus 4 cancels the above-described exclusion processing, and restarts a print job presence/absence inquiry to the server 2, similar to the inquiry described in step S500. When canceling the exclusion processing, the printing apparatus 4 may confirm that a print job to be printed does not remain in the printing apparatus 4.

A case in which the job acquisition unit 24 determines in step S502 that print data has a format capable of print processing by the printing apparatus 4 will be described. In this case, format conversion processing in the data conversion unit 25 of the server 2 is unnecessary, so print data stored in the server 1 need not be accumulated in the server 2. Hence, the printing apparatus 4 directly acquires print data from the server 1.

Since print data is not accumulated in the server 2, the job acquisition unit 24 of the server 2 directly advances to the processing in step S510 without registering a provisional print job in the management database unit 22. The job acquisition unit 24 acquires a job ticket in step S511, and transmits a print data acquisition request (not shown) to the data conversion unit 25. In steps S518 and S519, the data conversion unit 25 acquires print data from the server 1. However, the data conversion unit 25 does not execute format conversion processing for the acquired print data. The data conversion unit 25 notifies the job acquisition unit 24 of the completion of acquisition (not shown). In step S521, the job acquisition unit 24 registers, in the management database unit 22, a print job which designates print data capable of print processing by the printing apparatus 4. Then, the processes in steps S522 to S525 are performed. When format conversion as described above is not performed, the printing apparatus 4 requests print data of the server 1 and acquires it. Processing of acquiring and printing print data by the printing apparatus 4 is the same as the above-described one.

As described above, in the system according to the embodiment in which the printing apparatus acquires print data from the server and prints, before acquiring print data from the server 1, the server 2 confirms whether the printing apparatus 4 acquires a provisional print job, thereby determining whether the printing apparatus 4 is in the image printable state. If the server 2 determines that the printing apparatus 4 is in the image printable state, it requests print data of the server 1 and receives the print data. If the server 2 determines that the printing apparatus 4 is in the image unprintable state, it does not receive print data.

Accordingly, it can be prevented to receive print data to be printed by the server 2 though the printing apparatus 4 cannot print an image. It can therefore be prevented to accumulate print data in the server 2 and waste the memory capacity of the server 2.

As described above, in the embodiment, whether the printing apparatus is in the printable state is confirmed by issuing a provisional print job. The state of the printing apparatus can be determined by an arrangement for issuing a job to the printing apparatus, without a special arrangement for acquiring the status of the printing apparatus.

In the embodiment, when the printing apparatus 4 acquires a provisional print job, it controls to exclude another processing other than print processing corresponding to the provisional print job. This can obviate the need to hold print data in the server 2 till the completion of processing other than the print processing when the printing apparatus 4 performs printing corresponding to the provisional print job.

In the above description, it is determined after step S502 whether print data has a format capable of print processing by the printing apparatus 4. However, this determination may be made after a provisional print job is registered in the management database unit 22 in step S503 and then a job ticket is acquired in step S511. In this case, if it is determined that print data has a format capable of print processing, not a conversion request in step S516, but the above-mentioned print data acquisition request is issued to the data conversion unit 25. Subsequent processes are the same as those described above.

The job acquisition unit 24 and data conversion unit 25 are included in the server 2 in the embodiment, but may be configured as separate individual apparatuses. In this case, an apparatus corresponding to the job acquisition unit 24 issues a provisional print job, and whether the printing apparatus can print an image is confirmed based on whether the printing apparatus has received the provisional print job. If it is determined that the printing apparatus can print an image, the data conversion unit 25 acquires print data.

In the embodiment, the printing apparatus 4 performs polling to acquire a print job from the server 2. When the printing apparatus 4 does not acquire a print job, it can be determined that the printing apparatus 4 is in the image unprintable state.

However, when the server 2 can transmit a print job to the printing apparatus 4, the state of the printing apparatus 4 may be determined from a response from the printing apparatus 4 upon transmitting a print job from the server 2 to the printing apparatus 4. For example, when there is no response from the printing apparatus 4, it may be determined that the printing apparatus 4 is OFF and is in the image unprintable state. The state of the printing apparatus 4 may be determined based on the contents of a response from the printing apparatus 4. For example, when the contents of a response from the printing apparatus 4 represent an error such as paper shortage or ink shortage, it may be determined that the printing apparatus 4 is in the image unprintable state.

The printing apparatus 4 and server 2 are separate apparatuses in the embodiment, but may be integrated into one apparatus. In this case, it is confirmed whether a printing apparatus in the apparatus has acquired a provisional print job. In accordance with the confirmation result, print data is acquired from the server.

In the embodiment, processing of registering an actual print job in step S521 is performed upon completion of conversion processing by the data conversion unit 25. However, the processing in step S521 may be executed at the timing when preparation of conversion processing is completed after a conversion request in step S516. In the embodiment, the server 1 notifies the job acquisition unit 24 of the server 2 of a print job, and then the job acquisition unit 24 registers a provisional print job. However, instead of processing in step S502, the server 1 may directly register a provisional print job in the management database unit 22 of the server 2.

Further, data to be printed that is stored in the server is not limited to image data, but may be various data such as text data.

In the above embodiment, a print job contains, as data for executing printing, information which designates data to be printed. However, the contained data is not limited to this, and a print job may contain data to be printed (for example, text data of a text to be printed or image data of an image to be printed). In this case, when a print job contains data to be printed, the printing apparatus prints. When a provisional print job is configured not to contain data to be printed, it can be confirmed that the printing apparatus can receive a print job, without causing the printing apparatus to print.

In the above embodiment, the printing apparatus acquires a print job by periodically performing polling by the printing apparatus. At this time, the printing apparatus confirms the remaining amounts of printing material such as ink and paper, and the presence/absence of an error such a paper jam. If the printing apparatus determines, as a result of the confirmation, that an image can be printed, it may perform polling. In this case, when the printing apparatus receives a provisional print job, paper and ink are properly set in the printing apparatus and no error occurs. Thus, upon receiving a print job later, the printing apparatus can appropriately print an image.

>Other Embodiments≤

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-179913, filed Aug. 19, 2011, which is hereby incorporated by reference herein in its entirety.

What is claimed is:

1. An apparatus comprising:
   an issuing unit configured to issue a provisional job which does not contain execution data for causing a printing device to perform print processing, and to issue a print job which contains the execution data; and
   a determination unit configured to determine to cause the printing device to perform print processing on a condition that the printing device receives the provisional job which is issued by said issuing unit,
   wherein, in a case where said determination unit determines to cause the printing device to perform print processing, said issuing unit is configured to issue the print job to the printing device, and
   wherein said issuing unit is configured to issue the provisional job and the print job in a common data format.

2. The apparatus according to claim 1, further comprising:
   an acquisition unit configured to acquire the execution data from an external apparatus,
   wherein said acquisition unit is configured to wait for acquisition of the execution data until said determination unit determines to cause the printing device to perform print processing, and
   said issuing unit is configured to issue the print job containing the execution data acquired by said acquisition unit.

3. The apparatus according to claim 1,
   wherein the provisional job is received by the printing device by polling from the printing device to the apparatus,
   wherein said determination unit is configured to make the determination based on a receipt acknowledgement of the provisional job from the printing device.

4. The apparatus according to claim 1, wherein,
   said issuing unit issues the print job containing, as the execution data, information for specifying a storage location of data to be printed.

5. The apparatus according to claim 1, further comprising a deletion unit configured to delete the print job from the apparatus upon completion of print processing based on the print job in the printing device.

6. A method comprising the steps of:
   issuing a provisional job which does not contain execution data for causing a printing device to perform print processing;
   determining to cause the printing device to perform print processing on a condition that the printing device receives the provisional job which is issued in the issuing step; and
   in a case where the printing device is determined in the determination step to be caused to perform print processing, issuing a print job which contains the execution data and has a data format in common with the provisional job, to the printing device.

7. A non-transitory computer-readable storage medium storing a program for causing a printing device to print an image, the program causing a computer to:
   issue a provisional job which does not contain execution data for causing the printing device to perform print processing,
   determine to cause the printing device to perform print processing on a condition that the printing device receives the issued provisional job, and
   in a case where the printing device is determined to be caused to perform print processing, issue a print job which contains the execution data and has a data format in common with the provisional job, to the printing device.

8. The apparatus according to claim 1, further comprising:
   a conversion unit configured to convert data to be printed by the printing device, to image data,
   wherein said conversion unit is configured to wait for conversion of the data until said determination unit determines to cause the printing device to perform print processing.

9. The apparatus according to claim 1, wherein said issuing unit issues the print job containing, as the execution data, data to be printed.

10. The method according to claim 6, further comprising:
    an acquisition step of acquiring the execution data from an external apparatus, wherein said acquisition step waits for acquisition of the execution data until said determination step determines to cause the printing device to perform print processing, and said issuing step issues the print job containing the execution data acquired by said acquisition step.

11. The method according to claim 6, wherein the provisional job is received by the printing device by polling from the printing device to the apparatus, wherein said determination step makes the determination based on a receipt acknowledgement of the provisional job from the printing device.

12. The method according to claim 6, wherein, said issuing step issues the print job containing, as the execution data, information for specifying a storage location of data to be printed.

13. The method according to claim 6, further comprising a deletion step of deleting the print job from the apparatus upon completion of print processing based on the print job in the printing device.

14. The method according to claim 6, further comprising:

a conversion step of converting data to be printed by the printing device, to image data, wherein said conversion step waits for conversion of the data until said determination step determines to cause the printing device to perform print processing.

15. The method according to claim 6, wherein said issuing step issues the print job containing, as the execution data, data to be printed.

16. A system including an apparatus and a printing device, the apparatus comprising:

an issuing unit configured to issue a provisional job which does not contain execution data for causing a printing device to perform print processing, and to issue a print job which contains the execution data; and a determination unit configured to determine to cause the printing device to perform print processing on a condition that the printing device receives the provisional job which is issued by said issuing unit, and the printing device comprising;

a receiving unit configured to receive the provisional job, and to receive the print job, wherein, in a case where said determination unit determines to cause the printing device to perform print processing, said issuing unit is configured to issue the print job to the printing device, and wherein said issuing unit is configured to issue the provisional job and the print job in a common data format.

17. The system according to claim 16, wherein until the printing device performs print processing based on the print job corresponding to the provisional job after the printing device receives the provisional job issued by said issuing unit, the printing device controls not to perform other print processes.

* * * * *